(12) United States Patent
Dutta (10) Patent No.: US 6,760,581 B2
(45) Date of Patent: Jul. 6, 2004

(54) SYSTEM AND METHOD FOR IMPROVED MOBILE PHONE FUNCTIONALITY

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/817,458

(22) Filed: Mar. 26, 2001

(65) Prior Publication Data

US 2002/0137493 A1 Sep. 26, 2002

(51) Int. Cl.[7] .......................... H04M 3/42; H04M 1/00
(52) U.S. Cl. ................... 455/414.1; 455/415; 455/417; 455/418; 455/567; 379/201.01; 379/215.01
(58) Field of Search .......................... 455/414.1, 417, 455/415, 567, 418, 422.1, 456.1; 379/56.1, 88.19, 88.21, 201.01, 211.01, 215.01

(56) References Cited

U.S. PATENT DOCUMENTS

| | | | | |
|---|---|---|---|---|
| 6,377,795 B1 | * | 4/2002 | Bach et al. ................. | 455/417 |
| 6,393,272 B1 | * | 5/2002 | Cannon et al. ............. | 455/413 |
| 6,631,258 B1 | * | 10/2003 | Chow et al. ................ | 455/417 |
| 2001/0006546 A1 | * | 7/2001 | Jung .......................... | 455/567 |
| 2001/0031631 A1 | * | 10/2001 | Pitts .......................... | 455/411 |
| 2001/0041596 A1 | * | 11/2001 | Forlenzo et al. ........... | 455/566 |

\* cited by examiner

*Primary Examiner*—Fan Tsang
*Assistant Examiner*—Ovidio Escalante
(74) *Attorney, Agent, or Firm*—Joseph T. VanLeeuwen; Leslie A. VanLeeuwen (57) ABSTRACT

A system and method for providing a hold operation from a mobile telephone. When a call is received and the mobile telephone user cannot readily answer the phone, he presses a "hold" key on the mobile telephone. The hold key plays a message to the caller informing the caller that the receiver intends to answer the call momentarily. In this manner, calls received in places where mobile telephone calls are discouraged or prohibited can be placed on hold until the receiver has moved to a location where he can answer the call. For example, in a theater incoming calls can be held so the user can move to a hallway where he can answer the call and talk to the caller. Wireless technology (Bluetooth) is used to automatically hold calls when the mobile telephone receives a command from a server that installed in the theater or other public place.

20 Claims, 7 Drawing Sheets

SYSTEM AND METHOD FOR IMPROVED MOBILE PHONE FUNCTIONALITY

BACKGROUND OF THE INVENTION

1. Technical Field

The present invention relates in general to a method and system for improving mobile telephones. More particularly, the present invention relates to a system and method for providing a temporary hold feature allowing the receiver additional time to answer an incoming call.

2. Description of the Related Art

Mobile telephones are available to perform a wide variety of tasks. Semiconductor technology has enabled mobile telephone devices to better assist people in their daily activities. Mobile telephones, for example, can not only be used to place telephone calls but can also be used to access the Internet, send and receive email, check stock quotes and sports scores, and act as a personal digital assistant (or PDA). In addition, mobile telephones can be used to call a person almost regardless of where the person is located.

Mobile telephones connect to a telephone network using a wireless connection. Because of their portability, users frequently carry mobile telephones with them throughout their day. In this manner, functions within the mobile telephone are available to the user throughout the day.

Their mobility makes mobile telephones an important piece of equipment. Users often take their mobile telephones with them to the office, in the car, and wherever they might go. Because the caller does not know the recipient's current location, the caller is unable to ascertain whether the recipient is in a location where answering the mobile telephone call is inappropriate. For example, if the recipient is in a meeting, at church, or in a movie theatre it may be considered highly rude to answer a mobile telephone call and begin a conversation.

Many mobile phones operate in a vibrating mode so that the incoming call does not cause an audible signal, or ring, when received. In addition, many mobile phones provide a caller identification feature so that the phone number and name of the caller is displayed on the mobile phone's display screen. If a user is waiting for an important call and is in a place where he cannot begin talking, such as while attending a meeting, he can set the phone in "vibrate" mode and, when he feels the phone vibrate, he can check the caller identification display to determine the identity of the caller. If the user determines that an important call is being received, he often has to hurry to a hallway or other place where he can talk. In the meantime, the voicemail feature of the telephone may have already informed the caller that the recipient is unavailable, or the caller assumed the recipient was unavailable and hung up.

Another way the recipient can handle the important telephone call is by answering the call and whispering to the caller that he is moving to a location where he can talk freely. This second choice presents certain challenges. First, the people in the meeting may still be distracted and feel that the recipient's actions are rude or otherwise unacceptable. Second, the caller may not be able to hear the recipient's whisper and determine that he has a bad connection and hang up.

What is needed, therefore, is a way to inform the caller that the recipient will be answering the phone in a short amount of time, thereby preventing the caller from hanging up, preventing voice mail from answering the call, and enabling the recipient to politely move to an appropriate speaking place without unduly disturbing a group of people.

SUMMARY

It has been discovered that a "hold" button can be provided with a mobile telephone. When the recipient notices an incoming call, he can check the caller identification and determine whether the call is important. If the recipient wishes to talk to the caller but cannot talk at the present time, he presses the hold button which causes a message to be read to the caller informing the caller that the recipient will answer the phone shortly. The recipient can then politely and calmly move to a location where he can talk before answering the phone.

Additionally, a hold reminder can be enabled that, after a predetermined amount of time, will notify the user that the caller is waiting on the line. This prevents the recipient from putting a caller on hold and inadvertently forgetting about the call because of discussion taking place at the meeting, sports event, etc.

Furthermore, Bluetooth technology can be enabled to allow automatic holding of certain calls based upon the user's surroundings. For example, the user may select one or more potential important callers. If the user enters a church, theatre, or museum, a Bluetooth server device may send wireless commands to mobile telephones instructing them to automatically hold calls. The mobile telephone receives the instruction and automatically holds calls if they are from anyone on the list of potential important callers. In this example, when the user enters a movie theatre using Bluetooth technology to instruct mobile phones to hold calls, the hold feature would automatically be invoked. When an important call is received, the recipient's phone would vibrate and the recipient would see that the important call was being held. The recipient could then leave the theatre and go to the hallway in order to answer the call.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
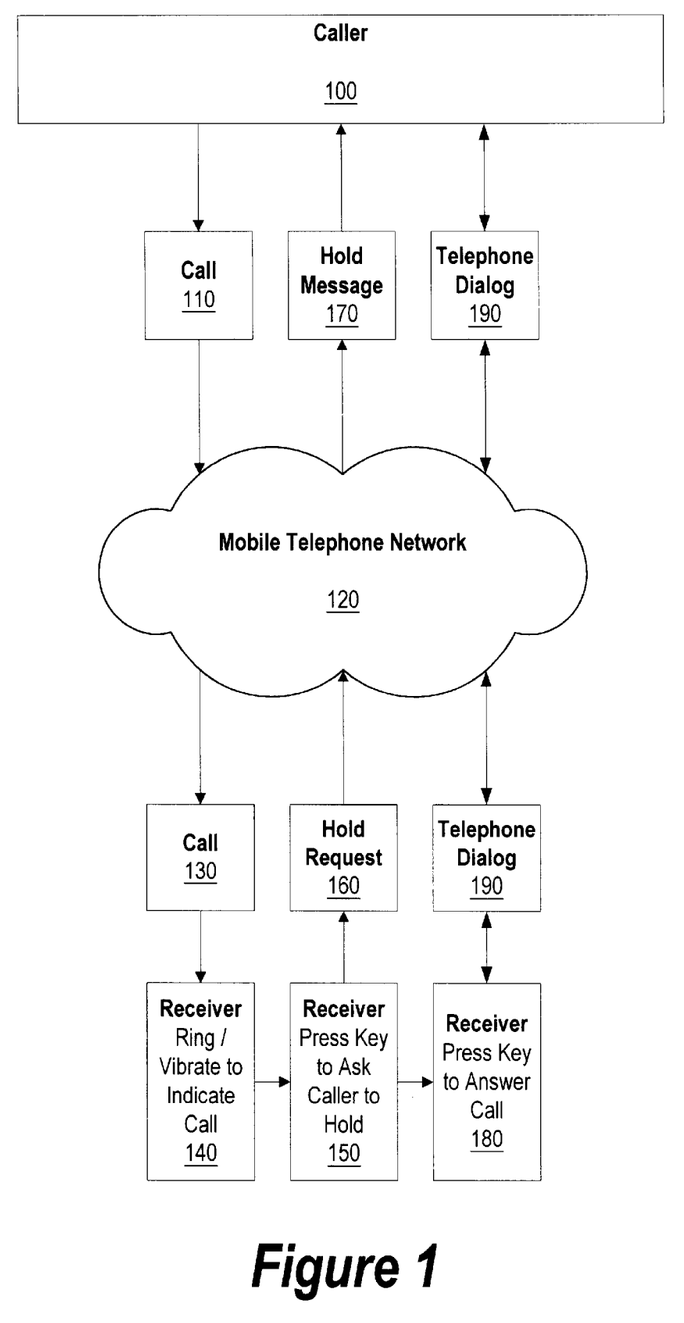
FIG. 1 is a network diagram of calls being received, held, and subsequently answered.

FIG. 1 is a network diagram of calls being received, held, and subsequently answered. Caller 100 places call 110 through mobile telephone network 120. Mobile telephone network 120 passes call 130 along to mobile telephone receiver 140 causing the mobile telephone to ring or vibrate indicating that a call is being received.

The receiver checks the identity of the caller and decides hold the call. The receiver presses a hold key (step 150). The mobile telephone sends hold request 160 to the caller through mobile telephone network 120. Caller 100 receives hold message 170. The substance of hold message 170 instructs caller that the receiver intends to answer the call momentarily.

When the receiver is in a position where he can answer the call, he presses a key on the mobile telephone (i.e., the "talk" key) to answer the call (step 180). Pressing the "talk" key stops the call from being held and allows telephone dialog 190 to be transmitted and received through mobile telephone network 120 by both caller 100 and the receiver.

Figure 2:
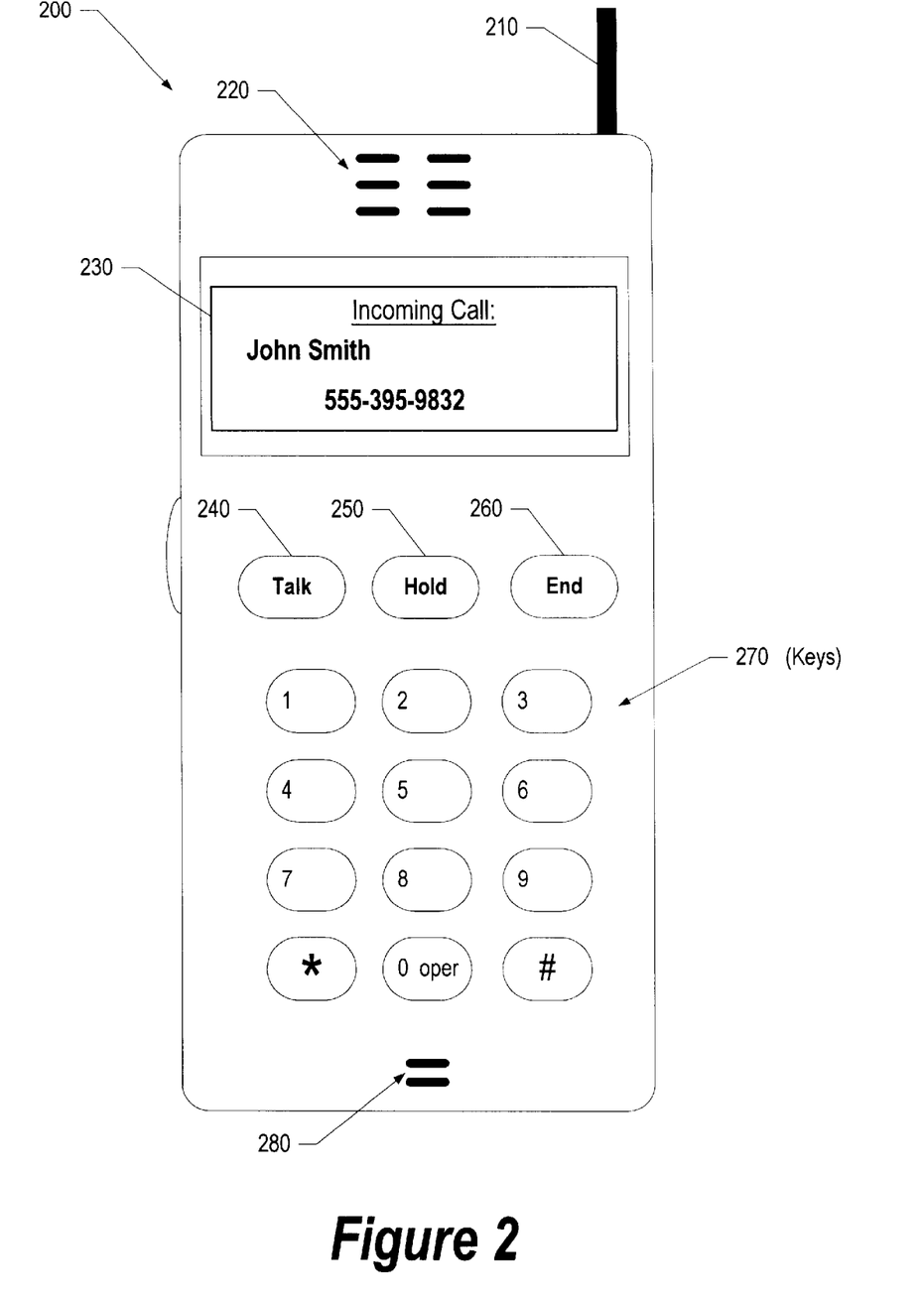
FIG. 2 is an external diagram of a mobile telephone incorporating a hold button.

FIG. 2 is an external diagram of a mobile telephone incorporating a hold button. Mobile telephone 200 includes antenna 210 for receiving and transmitting wireless signals to and from the mobile telephone network. Mobile telephone 200 also includes speaker 220 for playing audible signals received by mobile telephone 200 through the mobile telephone network. Display screen 230 is used to display caller identification information pertaining to incoming calls as well as telephone directory information and other mobile telephone configuration information. Mobile telephone 200 includes a variety of keys that the user presses to perform various functions or to enter phone numbers or alphanumeric data.

Talk button 240 is used to answer a call or to initiate a call when the mobile telephone user places a call. Hold button 250 is used to hold an incoming call so that the mobile telephone user can take additional time to finish a task or leave a room in order to answer the call. End button 260 is used to hang up the mobile telephone. Keys 270 are used to enter numbers, star (*) functions, and pound sign (#) functions. Microphone 280 is used to capture words spoken by the mobile telephone user and transmit them to the other party.

Figure 3:
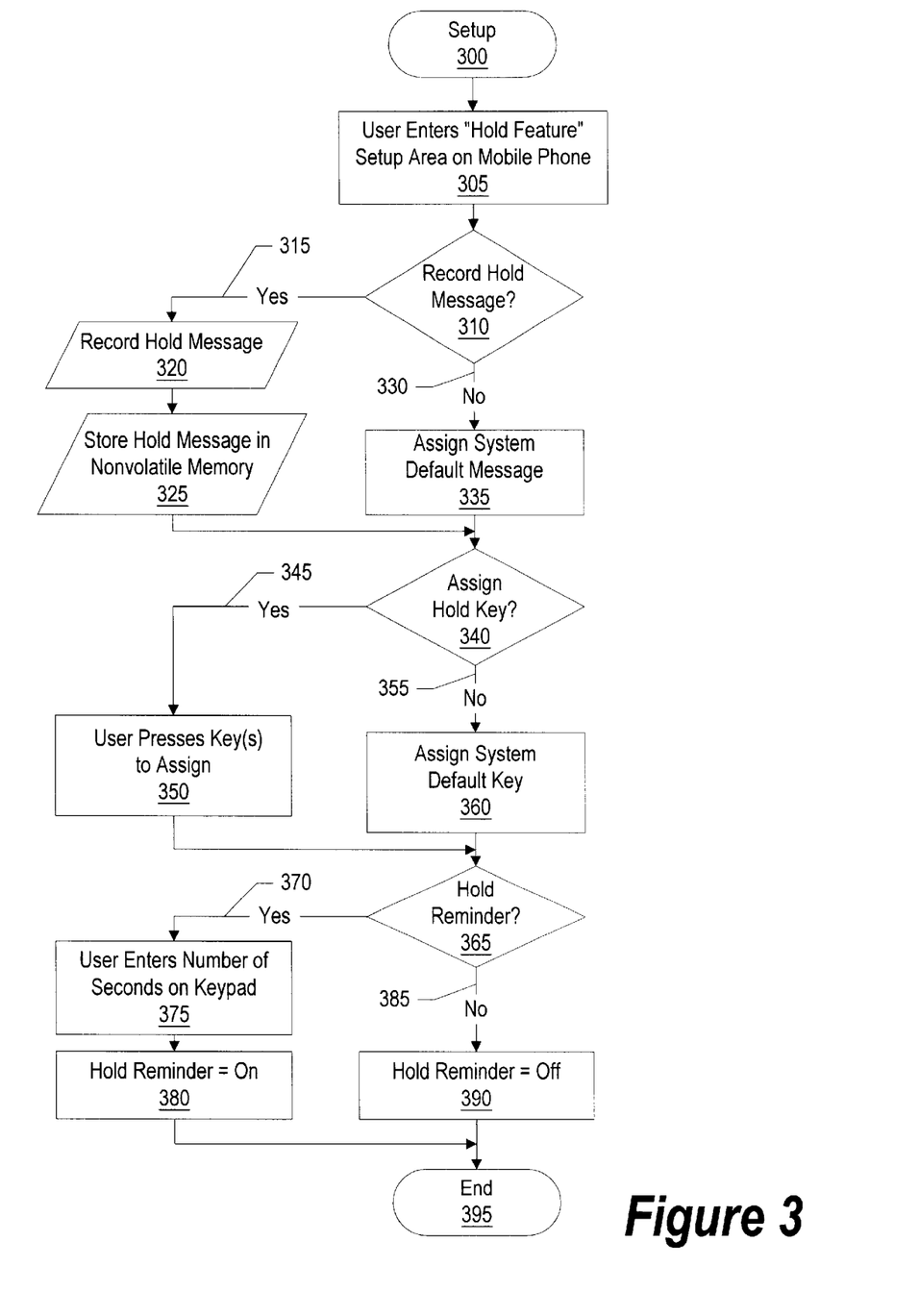
FIG. 3 is a flowchart of a user setting up the hold feature on a mobile telephone.

FIG. 3 is a flowchart of a user setting up the hold feature on a mobile telephone. Processing commences at 300 whereupon the user enters a setup area for the hold feature on his mobile telephone (step 305). A determination is made as to whether the user wishes to record a hold message (decision 310). If the user wishes to record a hold message, decision 310 branches to "yes" branch 315 whereupon the system records a hold message from the user (step 320, i.e., the user speaks into the mobile telephone microphone) and the recorded message is stored in the mobile phone's nonvolatile memory (step 325). On the other hand, if the user does not want to record a hold message, decision 310 branches to "no" branch 330 whereupon a default message is assigned to be played when the user presses the hold button.

A determination is also made as to whether to assign a hold key (decision 340). If a hold key is to be assigned, decision 340 branches to "yes" branch 345 whereupon the user presses one or more keys to assign to function as the hold key (step 350). For example, the user could program a combination of keys, such as the star key ("*") followed by a numeric key (i.e., "1") to act as a hold key. On the other hand, if a hold key is not assigned, a default key is assigned to function as a hold key (step 360). On some mobile telephones, such as the one depicted in FIG. 2, a special hold key is provided and labeled so that the user does not have to remember a specific unlabeled key or key combination.

Another determination is made as to whether a hold reminder is provided to the mobile phone user (decision 365). If the user wants a hold reminder, decision 365 branches to "yes" branch 370 whereupon the user enters the number of seconds that the user wishes to use as the interval before a reminder is provided by the mobile telephone (step 375) and the hold reminder flag is turned "on" (step 380). On the other hand, if the user does not want a hold reminder, decision 365 branches to "no" branch 385 whereupon the hold reminder flag is turned "off" (step 390. Setup hold feature processing ends at 395.

Figure 4:
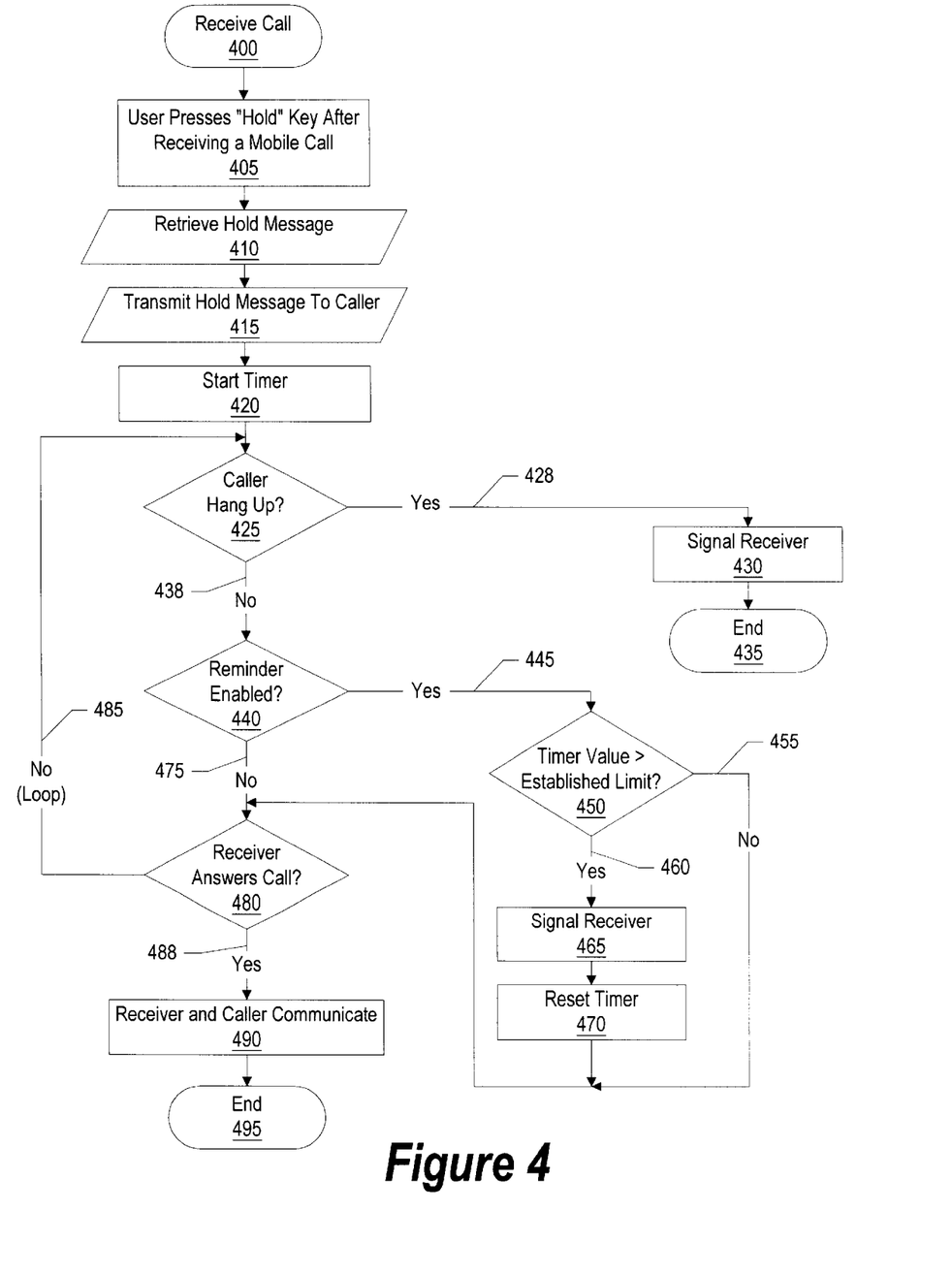
FIG. 4 is a flowchart of a user using the hold feature in response to receiving a call.

FIG. 4 is a flowchart of a user using the hold feature in response to receiving a call. Processing commences at 400 when the user presses the assigned hold key on the mobile telephone after receiving a telephone call (step 405). The assigned hold message is retrieved from a nonvolatile memory area within the mobile telephone (input 410). The assigned hold message may be a default message or a message previously recorded by the user (see FIG. 3). The retrieved hold message is transmitted to the caller (output 415), informing the caller that the receiver intends to answer the telephone momentarily. A timer is started (step 420) for calculating the amount of time that the caller is on hold.

A determination is made as to whether the caller has hung up (decision 425). If the caller has hung up, decision 425 branches to "yes" branch 428 whereupon a signal, such as a vibration or a ring, emanates from the mobile phone notifying the receiver that the caller has hung up (step 430), and processing ends at 435.

If the caller has not hung up, decision 425 branches to "no" branch 438 whereupon a determination is made as to whether the mobile phone user wishes to receive a reminder that a caller is currently holding (decision 440). If the user previously requested such reminders (see FIG. 3), decision 440 branches to "yes" branch 445 whereupon a determination is made as to whether the timer value (started in step 420) has exceeded a predefined limit (decision 450).

If the limit is exceeded, decision 450 branches to "yes" branch 460 and a signal, such as a vibration or a ring, emanates from the mobile phone reminding the user that a caller is on hold (step 465) and the timer is reset (step 470) to enable future reminders. On the other hand, if the limit is not exceeded, decision 450 branches to "no" branch 455 bypassing the signaling and resetting steps. Both "yes" branch 460 and "no" branch 455 return to continue processing the incoming call.

A determination is made as to whether the user has answered the incoming call on the mobile telephone (decision 480). If the user has not answered the call, decision 480 branches to "no" branch 485 which loops back to determine whether the caller has hung up or whether the user needs to be reminded of the holding caller. This looping continues until either the caller hangs up or the user answers the mobile telephone. When the user answers the call on the mobile telephone, decision 480 branches to "yes" branch 488 whereupon the user and the caller communicate (step 490) and mobile telephone hold processing ends at 495.

Figure 5:
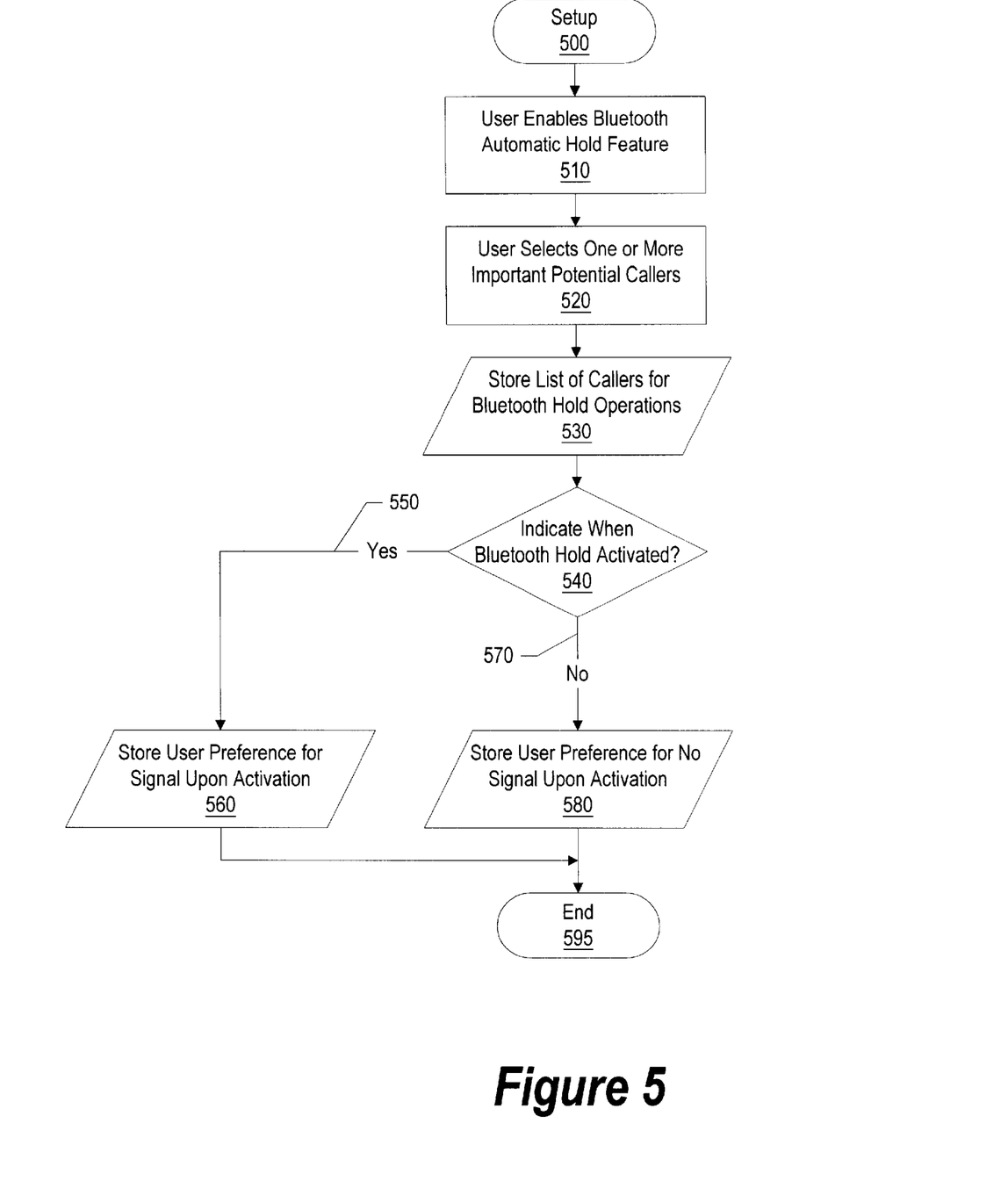
FIG. 5 is a flowchart of a user enabling the mobile telephone to automatically hold calls in response to a Bluetooth technology hold command.

FIG. 5 is a flowchart of a user enabling the mobile telephone to automatically hold calls in response to a Bluetooth technology hold command. Processing commences at 500 whereupon the mobile telephone user sets up or enables the mobile telephone to receive and process commands sent from a server using Bluetooth wireless network technology (step 510). The user can select one or more callers from a directory stored on the mobile telephone (step 520). The user can select all calls (i.e., "*" to indicate all calls should be automatically held), or may limit the selection to individual names or phone numbers. The list of selected callers is stored in a nonvolatile memory area of the mobile telephone for future Bluetooth hold operations (output 530). A determination is made as to whether the mobile telephone user wants to be notified when a Bluetooth hold operation is activated (decision 540). If the user does want to be notified, decision 540 branches to "yes" branch 550 and the user's preference to be notified is stored in a nonvolatile memory area within the mobile telephone (output 560). On the other hand, if the user does not wish to be notified, decision 540 branches to "no" branch 570 whereupon the user's preference to not be notified is stored in a nonvolatile memory area within the mobile telephone (output 580). Bluetooth setup processing ends at 595.

Figure 6:
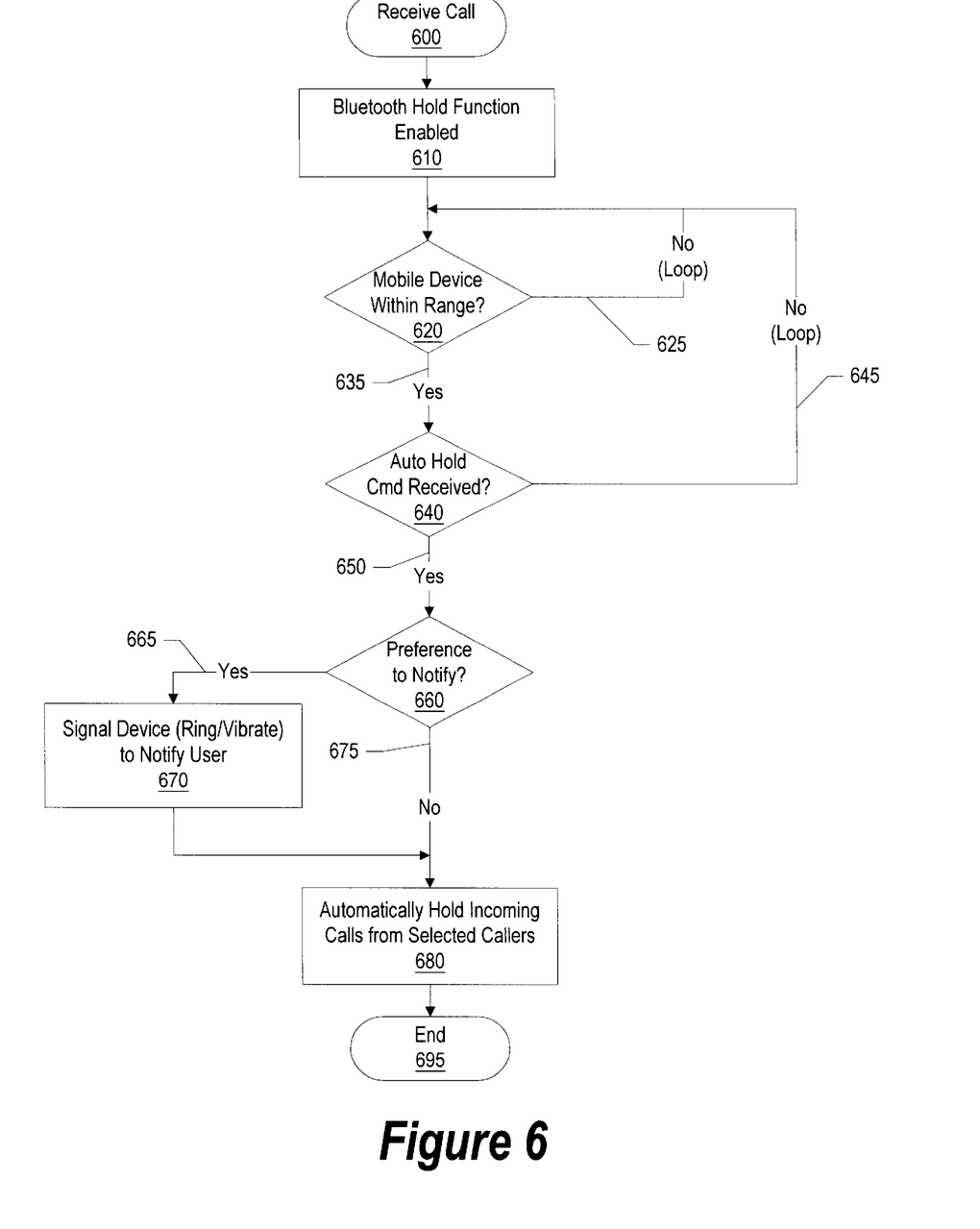
FIG. 6 is a flowchart of a mobile phone responding to Bluetooth automatic hold commands.

FIG. 6 is a flowchart of a mobile phone responding to Bluetooth automatic hold commands. Processing commences at 600 when a request is received from the Bluetooth enabled mobile telephone to automatically hold incoming calls (step 610). For example, a theatre or concert hall may have a Bluetooth server that sends wireless commands instructing Bluetooth enabled devices to automatically hold incoming telephone calls so that users do not answer telephone calls in the theatre or concert hall. A determination is made whether the mobile telephone is within range to receive the Bluetooth server's hold command (decision 620). If the mobile telephone is not in range, decision 620 branches to "no" branch 625 which repeatedly loops until the mobile telephone is in range to receive the Bluetooth server's command.

If the mobile telephone is in range of the Bluetooth server to receive the hold command, decision 620 branches to "yes" branch 635. A determination is made as to whether the Bluetooth server is requesting that the mobile telephone automatically hold incoming calls (decision 640). If such a command is not received, decision 640 branches to "no" branch 645 which may process the other command(s) received before looping back to wait for an automatic hold command. If an automatic hold command is received from the Bluetooth server, decision 640 branches to "yes" branch 650.

A determination is made as to whether the mobile telephone user wants to be notified when the automatic hold function is triggered by a Bluetooth server command (decision 660). If the user wishes to be notified (see FIG. 5 for details regarding the user's preference), decision 660 branches to "yes" branch 665 whereupon a signal, such as a vibration or a ring, emanates from the mobile phone informing the user that an automatic hold request has been received from a Bluetooth server (step 670).

After the Bluetooth hold command has been received and processed, selected incoming calls are automatically held (step 680). Automatic holding of a call checks to determine whether the incoming caller is on the user's pre-selected list (see FIG. 5, step 520). If the caller is on the pre-selected list, a signal, such as a vibration or a ring, emanates from the mobile phone informing the user that a caller has been placed on hold. The user can either answer the call (i.e., by pressing the "talk" button) or can send the caller to his voicemail (i.e., by pressing the "end" button). When the mobile telephone is no longer in range of the Bluetooth server, and therefore no longer receives commands to begin automatic hold operations, the mobile telephone stops the automatic hold function. This can be accomplished by setting a timer in the mobile telephone. After a predetermined amount of time, if no more Bluetooth hold commands are received, the telephone turns off the automatic hold feature. The feature is turned off because the mobile telephone is likely out of range of the Bluetooth server and, therefore, no longer in the theatre or concert hall. Processing of Bluetooth automatic hold commands ends at 695.

Figure 7:
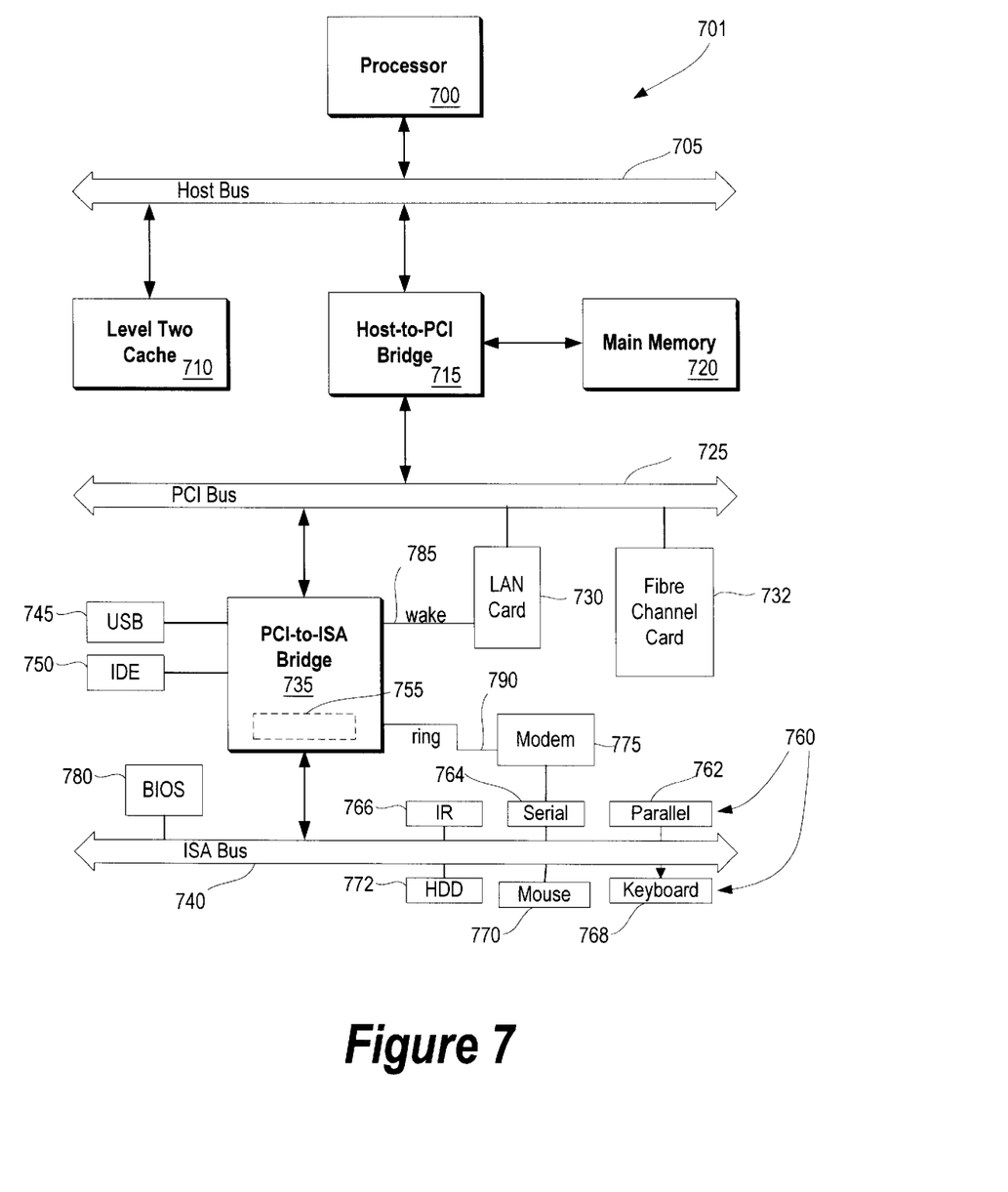
FIG. 7 is a block diagram of an information handling system capable of implementing the present invention.

FIG. 7 illustrates information handling system 701 which is a simplified example of a computer system capable of performing the mobile telephone company operations. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A mobile telephone comprising:
   one or more processors;
   a nonvolatile storage area accessible by the processors;
   a receiver for receiving mobile telephone signals;
   a transmitter for sending mobile telephone signals;
   a keypad for entering numbers;
   a signaler for signaling a user of the mobile telephone; and
   a hold function to hold an incoming call, the hold function including:
      means for receiving a hold request from the user, the hold request configuring an automatic hold feature;
      means for receiving, at the mobile telephone, a wireless hold command from a server;
      means for activating the automatic hold feature at the mobile telephone in response to receiving the hold command;
      means for signaling an incoming mobile telephone call to the mobile telephone through the receiver;
      means for automatically holding one or more of the incoming mobile telephone calls in response to the activation of the automatic hold feature; and
      means for transmitting a hold message through the transmitter to a caller corresponding to each of the automatically held incoming mobile telephone calls.

2. The mobile telephone as described in claim 1 further comprising:
   means for accessing a stored list of one or more important potential caller identifiers from the nonvolatile storage area; and
   means for determining whether one or more caller identifiers corresponding to each of the incoming mobile telephone calls match one of the important potential caller identifiers, wherein the automatically holding and transmitting are performed when the incoming caller identifier does not match one of the important potential caller identifiers.

3. The mobile telephone as described in claim 2 further comprising:
   means for receiving, from the user, the one or more important potential call identifiers prior to receiving the hold command from the server; and
   means for storing the received important potential call identifiers in the nonvolatile storage area.

4. The mobile telephone as described in claim 2 further comprising:
   means for notifying the user of the incoming mobile telephone call in response to the incoming caller identifier matching one of the important potential caller identifiers, the notifying using a signal transmitted from signaler, wherein the signal is selected from the group consisting of an audible signal and a vibration adapted to be felt by the user.

5. The mobile telephone as described in claim 1 further comprising:
   means for sensing that the mobile telephone is out of range from the server; and
   means for disabling the automatic holding of incoming mobile telephone calls in response to the sensing.

6. The mobile telephone as described in claim 5 further comprising:
   a time accessible from the processors, wherein the hold function further includes:
      means for setting the timer when the hold command is received;
      means for listening for subsequent hold commands; and
      means for disabling the automatic hold command in response to a the timer reaching a predetermined elapsed time value.

7. A method of handling incoming mobile telephone calls to a mobile telephone, said method comprising:
   receiving a hold request from a user, the hold request configuring an automatic hold feature;
   receiving, at the mobile telephone, a wireless hold command from a server;
   activating the automatic hold feature at the mobile telephone in response to receiving the hold command;
   signaling an incoming mobile telephone call to the mobile telephone;
   automatically holding one or more of the incoming mobile telephone calls in response to the activation of the automatic hold feature; and
   transmitting a hold message to a caller corresponding to each of the automatically held incoming mobile telephone calls.

8. The method as described in claim 7 further comprising:
   accessing a stored list of one or more important potential caller identifiers; and
   determining whether one or more caller identifiers corresponding to each of the incoming mobile telephone calls match one of the important potential caller identifiers, wherein the automatically holding and transmitting are performed when the incoming caller identifier does not match one of the important potential caller identifiers.

9. The method as described in claim 8 further comprising:
   receiving, from the user, the one or more important potential call identifiers prior to receiving the hold command from the server; and storing the received important potential call identifiers in the stored list.

10. The method as described in claim 8 further comprising:

notifying the user of the incoming mobile telephone call in response to the incoming caller identifier matching one of the important potential caller identifiers, the notifying using a signal transmitted from the mobile telephone, wherein the signal is selected from the group consisting of an audible signal and a vibration adapted to be felt by the user.

11. The method as described in claim 7 further comprising:

sensing that the mobile telephone is out of range from the server; and disabling the automatic holding of incoming mobile telephone calls in response to the sensing.

12. The method as described in claim 11 wherein the sensing further comprises:

setting a timer when the hold command is received;

listening for subsequent hold commands; and disabling the automatic hold command in response to a the timer reaching a predetermined elapsed time value.

13. The method as described in claim 7 further comprising:

notifying the user when the automatic hold feature has been activated, the notifying using a signal transmitted from the mobile telephone, wherein the signal is selected from the group consisting of an audible signal and a vibration adapted to be felt by the user.

14. A computer program product stored on a computer operable media adapted to handle incoming mobile telephone calls to a mobile telephone, said computer program product comprising:

means for receiving a hold request from a user, the hold request configuring an automatic hold feature;

means for receiving, at the mobile telephone, a wireless hold command from a server;

means for activating the automatic hold feature at the mobile telephone in response to receiving the hold command;

means for signaling an incoming mobile telephone call to the mobile telephone;

means for automatically holding one or more of the incoming mobile telephone calls in response to the activation of the automatic hold feature; and means for transmitting a hold message to a caller corresponding to each of the automatically held incoming mobile telephone calls.

15. The computer program product as described in claim 14 further comprising:

means for accessing a stored list of one or more important potential caller identifiers; and means for determining whether one or more caller identifiers corresponding to each of the incoming mobile telephone calls match one of the important potential caller identifiers, wherein the automatically holding and transmitting are performed when the incoming caller identifier does not match one of the important potential caller identifiers.

16. The computer program product as described in claim 15 further comprising:

means for receiving, from the user, the one or more important potential call identifiers prior to receiving the hold command from the server; and means for storing the received important potential call identifiers in the stored list.

17. The computer program product as described in claim 15 further comprising:

means for notifying the user of the incoming mobile telephone call in response to the incoming caller identifier matching one of the important potential caller identifiers, the notifying using a signal transmitted from the mobile telephone, wherein the signal is selected from the group consisting of an audible signal and a vibration adapted to be felt by the user.

18. The computer program product as described in claim 14 further comprising:

means for sensing that the mobile telephone is out of range from the server; and means for disabling the automatic holding of incoming mobile telephone calls in response to the sensing.

19. The computer program product as described in claim wherein the means for sensing further comprises:

means for setting a timer when the hold command is received;

means for listening for subsequent hold commands; and means for disabling the automatic hold command in response to a the timer reaching a predetermined elapsed time value.

20. The computer program product as described in claim 14 further comprising:

means for notifying the user when the automatic hold feature has been activated, the notifying using a signal transmitted from the mobile telephone, wherein the signal is selected from the group consisting of an audible signal and a vibration adapted to be felt by the user.

* * * * *

UNITED STATES PATENT AND TRADEMARK OFFICE
CERTIFICATE OF CORRECTION

PATENT NO.    : 6,760,581 B2
DATED         : July 6, 2004
INVENTOR(S)   : Dutta

It is certified that error appears in the above-identified patent and that said Letters Patent is hereby corrected as shown below:

Column 10,
Line 34, please delete "claim" and insert -- claim 18 --.

Signed and Sealed this

Twenty-eighth Day of December, 2004

JON W. DUDAS
*Director of the United States Patent and Trademark Office*